UNITED STATES PATENT OFFICE.

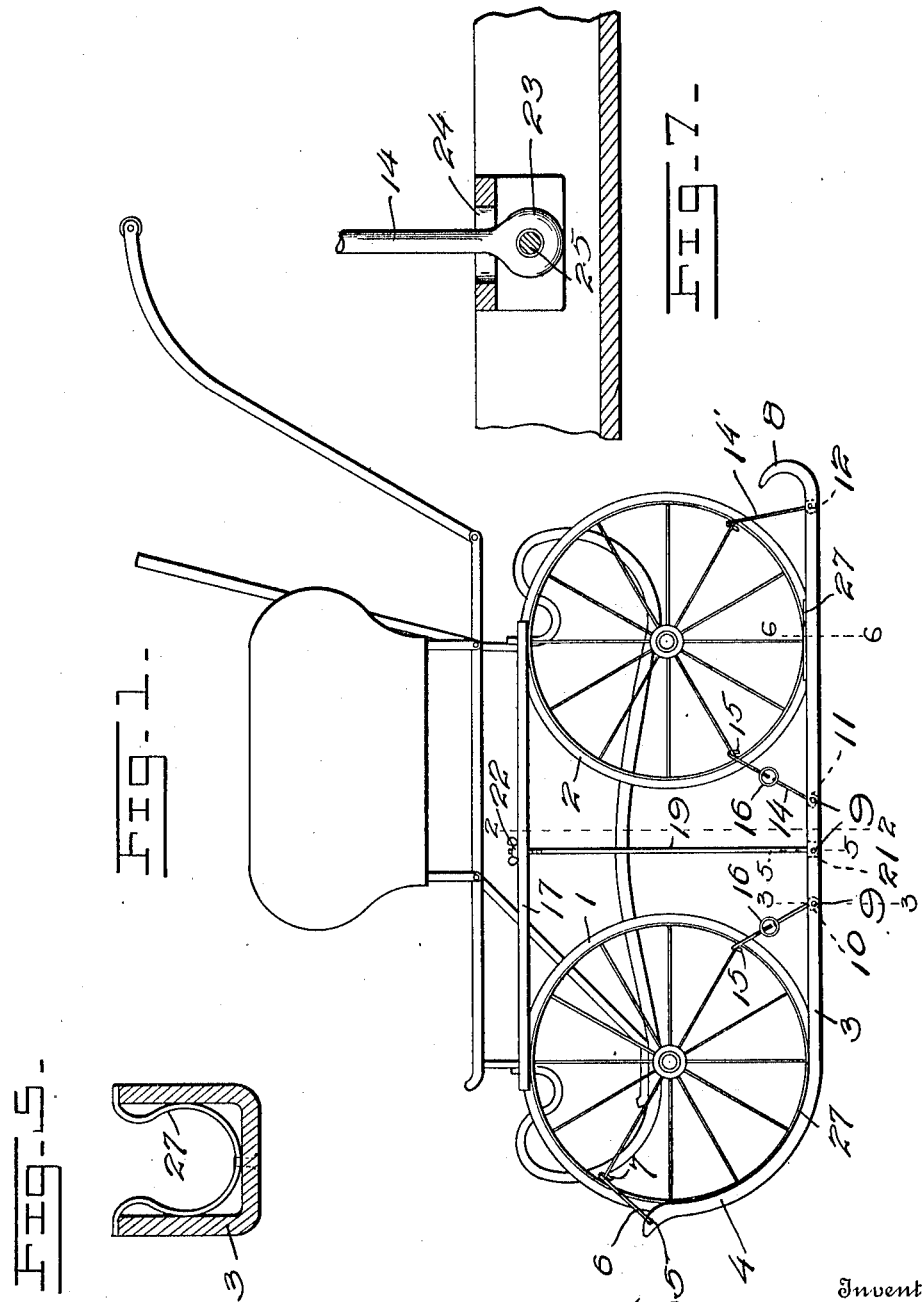

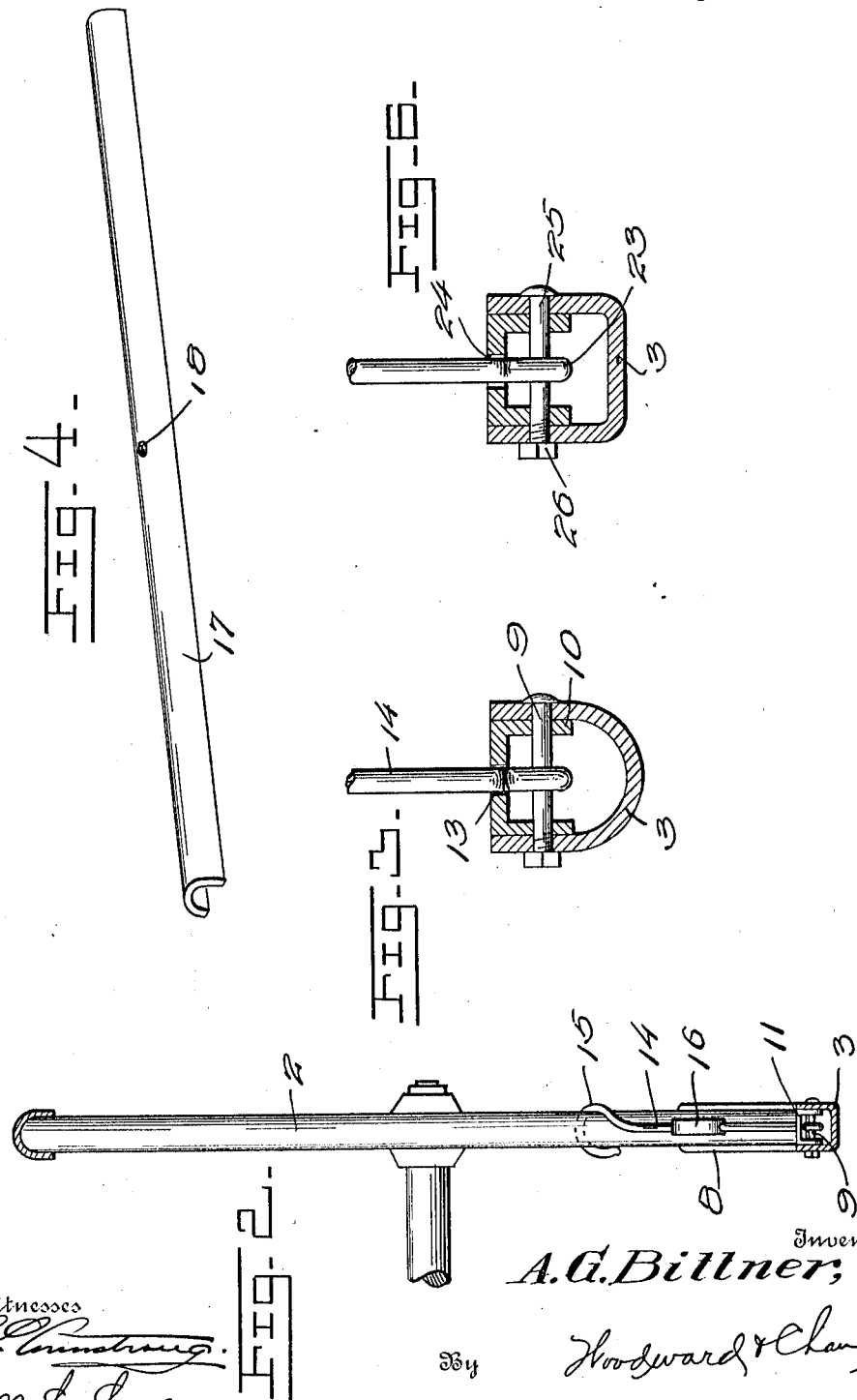

ARTHUR G. BITTNER, OF ROCK FALLS, ILLINOIS, ASSIGNOR TO WILLIAM T. STONE AND JACOB CANTLIN, OF ROCK FALLS, ILLINOIS.

DETACHABLE RUNNER.

1,035,521.  Specification of Letters Patent.  Patented Aug. 13, 1912.

Application filed May 17, 1910. Serial No. 561,805.

*To all whom it may concern:*

Be it known that I, ARTHUR G. BITTNER, a citizen of the United States, residing at Rock Falls, in the county of Whiteside and State of Illinois, have invented certain new and useful Improvements in Detachable Runners, of which the following is a specification.

This invention relates to improvements in sled runners to be attached to baby carriages, children's wagons, or the like, and has for one of its objects to provide a device of this character which is cheap and simple to manufacture.

Another object is to provide a sled runner which is simple in construction and easily applied to and detached from the aforesaid vehicles.

Still another object is to provide a detachable wheel runner which is adapted to be applied to children's carriages and wagons, without the necessity of removing the wheels.

With these and other objects in view, the invention consists in the peculiar construction, combination and arrangement of parts as shown in the drawing and pointed out in the claims, but it will be understood that minor changes may be made in the specific structure without departing from the spirit of the invention.

The invention is illustrated in the accompanying drawing in which,

Figure 1 is a side elevation of a baby carriage showing my invention applied, Fig. 2 is a vertical section on the line 2—2 of Fig. 1, Fig. 3 is a vertical section taken on the line 3—3 in Fig. 1, showing a modified form of runner, Fig. 4 is a detailed perspective view of the member applied to the tops of the wheels, Fig. 5 is a transverse section on the line 6—6 of Fig. 1, Fig. 6 is a transverse section showing the runner as an angular U in cross section, Fig. 7 is a longitudinal section of the runner.

Referring particularly to the drawing in which is shown a preferred form of my invention, 1 and 2 are the front and rear wheels of a baby carriage. The runner 3 as shown in section in Fig. 2 is a rectangularly shaped channel iron, in the trough of which the wheels 1 and 2 are seated. The runners 3 may, however, be U-shaped in cross section as seen in Fig. 3, and curved at the bottom. The front of the runner 3 is formed with a transverse opening 5, which is adapted to receive the tie rod 6, whose other end is provided with hooks 7 to engage the spokes of the wheel. The rear end of the runner 3 is also turned up at 8, but only for a short distance.

Secured in the channel of the runner by rivets 9, are the inverted U-shaped members 10, 11, and 12, the members 10 and 11 of which are located about midway of the length of the runner, and the other, 12, near the rear end of the runner. Each of the members 10, 11, and 12, is provided with centrally located elongated apertures 13, to receive the apertured end of the brace rods 14. The upper ends of the brace rods 14 are provided with hooks 15, which engage with the spokes of the wheel near the rim. Each of the brace rods 14 is divided in the center and threaded to which is applied a turnbuckle 16.

A straight bar, U-shaped in cross section is laid on the upper sides of the wheel as seen in the drawing, and marked 17, the tires of the wheels fitting in the channel. An aperture 18 is formed in the center of the bar 17 and receives the upper threaded end of a supplemental brace 19. The lower end of the supplemental brace 19 is apertured and is held in the aperture of the inverted U-shaped member 21, secured in the channel of the runner and between the members 10 and 11. To the upper threaded end of the supplemental brace 19 is applied a winged nut 22, which bears on the upper face of the bar 17. By the tightening of the nut 22, the wheels 1 and 2 are securely clamped between the rod or bar 17 and the runner 3.

As best shown in Fig. 7 the lower ends of the brace rods 14 are provided with apertured ends 23 which are inserted through the elongated slots 24 in the inverted members 10 and 11, and bolts 25 passed through the runner 3 and said inverted members, to the threaded ends of which are applied nuts 26. The lower ends of the supplemental braces 19 and the short rear braces 14′ are also formed with eyes 23 which after being passed through the inverted members 21 and 12 are secured by means of the bolts 25. (Figs. 1 and 7). The bolts 25 are adapted to be inserted in the eyes 23 of the lower ends of the braces, and serve the double function of securing the said rods to the runner and also the inverted members to the runners. If desired, the inverted members may be dispensed with and the bolts only used.

The runner is applied as follows: The wheels 1 and 2 are positioned in the channel of the runner 3 and the hooks of the brace rods 14 engage with the spokes of the wheels. The turnbuckle 16 is tightened which securely clamps the runner to the wheels. The bar 17 is seated on the upper faces of the wheels and the winged nut applied to the brace 19 and tightened against the said bar. The bar 17 and the brace 19 add rigidity to the entire structure and effectively prevent the wheels turning in the runners.

From the foregoing it will readily be seen that I have provided a very simple and cheap construction of detachable runner for children's carriages and wagons, and one which is easily applied and detached. Further the invention provides a device which securely clamps the wheels and prevents them from turning.

To take up any lateral play of the wheel in the channel of the runner I have provided the springs 27, as best seen in Fig. 5 of the drawing. When the springs 27 are used, the braces, except the forward one 6, may be dispensed with, as the stiffness of the springs will be sufficient to prevent vertical displacement of the wheels from the runner.

What is claimed is:

1. A detachable sled runner for vehicles comprising a runner member formed of channel iron having transversely alining apertures, inverted U-shaped members in the channel of said runner member, said U-shaped members being provided with alining apertures for registration with the first named apertures, bolts passing through said runner apertures and the apertures in said inverted U-shaped members, and braces extending through said U-shaped members and carrying means for engagement with said bolts.

2. A detachable sled runner for vehicles comprising a runner member, channels in said runner member, anchors having openings therein and being positioned in said channels, brace rods having hooks at one end to engage the spokes of the wheels, eye members on the lower ends of the brace rods, engaging in the aperture of said anchors, bolts for securing the anchors, and said brace rods to the runner members, a clamping bar on the upper edges of the wheels, and a vertically and centrally arranged bracing and clamping rod secured to one of said anchors and to the clamping bar.

3. A detachable sled runner for vehicles comprising runner members, channels in said runner members, anchors positioned in said channels and having lateral and vertical openings, brace rods having hooks on their upper ends to engage the spokes of the wheels, eye members on the lower ends of the brace rods engaging in said vertical openings of the anchors, turnbuckles on the brace rods, a channel bar embracing the upper portions of the wheels, a tie rod, an eye member on said rod, said tie rod being detachably and adjustably secured to the said channel bar, and bolts passing through openings in the runner members and said lateral openings in the anchor members and engaging in the eye members of said braces and tie rod.

4. The combination with the wheels of a vehicle runner members having channels for the reception of the lower portions of the wheels, U-shaped spring clips in the channels for engagement of the said lower portions of the wheels, means on the runner members for attachment to the wheels, tire engaging members on the upper portions of the wheels and bridging the spaces between the front and rear wheels, and rods secured to the runner members and extending vertically between the front and rear wheels, said rods being detachably and adjustably secured to said tire engaging members.

In testimony whereof I affix my signature, in presence of two witnesses.

ARTHUR G. BITTNER.

Witnesses:
H. L. BREWER,
F. P. McNITT.

Copies of this patent may be obtained for five cents each, by addressing the "Commissioner of Patents, Washington, D. C."